(12) United States Patent
Matteson et al.

(10) Patent No.: US 9,915,989 B2
(45) Date of Patent: Mar. 13, 2018

(54) ENERGY EFFICIENT WORKLOAD PLACEMENT MANAGEMENT USING PREDETERMINED SERVER EFFICIENCY DATA

(71) Applicant: Lenovo Enterprise Solutions (Singapore) Pte. Ltd., Singapore (SG)

(72) Inventors: Jason A. Matteson, Raleigh, NC (US); John W. Nicholson, Cary, NC (US); Aparna Vallury, Apex, NC (US); Scott Kelso, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 42 days.

(21) Appl. No.: 15/057,829

(22) Filed: Mar. 1, 2016

(65) Prior Publication Data
US 2017/0255239 A1 Sep. 7, 2017

(51) Int. Cl.
*G06F 1/00* (2006.01)
*G06F 1/26* (2006.01)
*G06F 1/32* (2006.01)
*G06F 9/50* (2006.01)

(52) U.S. Cl.
CPC .............. *G06F 1/26* (2013.01); *G06F 1/3209* (2013.01); *G06F 1/3296* (2013.01); *G06F 9/5083* (2013.01)

(58) Field of Classification Search
CPC ........ G06F 1/26; G06F 1/3209; G06F 1/3296; G06F 9/5083
See application file for complete search history.

(56) References Cited

U.S. PATENT DOCUMENTS

2011/0126206 A1* 5/2011 Kato ................. G06F 1/206
718/103
2012/0030356 A1* 2/2012 Fletcher ............ G06F 9/5094
709/226

OTHER PUBLICATIONS

Moore, Justin, et al. "Making Scheduling "Cool": Temperature-Aware Workload Placement in Data Centers", USENIX Association, 2005 USENIX Annaual Technical Conference, Aug. 2005, pp. 61-74.
Lefurgy, Charles "New Publications" http://researcher.watson.ibm.com/researcher/view_person_subpage.php?. . . , Nov. 16, 2015, pp. 1-26.
(Continued)

*Primary Examiner* — Austin Hicks
(74) *Attorney, Agent, or Firm* — Jeffrey L. Streets

(57) ABSTRACT

Additional workloads are assigned among servers in a power-efficient manner. For each of a plurality of servers, a stored power efficiency/capacity utilization relationship is accessed, current component power consumption values are obtained, and a current power consumption efficiency is calculated. An amount of capacity utilization necessary to perform an additional workload is obtained, and a predicted power consumption efficiency is determined for each server. The predicted efficiency is determined using the current power consumption efficiency of the server and the stored relationship. The workload is then assigned to the server identified as having the greatest predicted power consumption efficiency. Alternatively, the workload may be assigned to the server identified as having the greatest improvement in power consumption efficiency.

18 Claims, 5 Drawing Sheets

(56) References Cited

OTHER PUBLICATIONS

Michael K. Patterson, Stephen W. Poole, Chung-Hsing Hsu, Don Maxwell, William Tschudi, Henry Coles, David J. Martinez, Natalie Bates, "TUE, a New Energy-Efficiency Metric Applied at ORNL's Jaguar". 28th International Supercomputing Conference, ISC 2013, Leipzig, Germany, Jun. 16-20, 2013. Proceedings, 12 pages.

* cited by examiner

ENERGY EFFICIENT WORKLOAD PLACEMENT MANAGEMENT USING PREDETERMINED SERVER EFFICIENCY DATA

BACKGROUND

Field of the Invention

The present invention relates to methods of assigning workload instances among a plurality of servers.

Background of the Related Art

The power and cooling demands of large computing systems continue to increase. Data centers are currently being challenged to both sustain the increasing information technology (IT) demand, as well as to reduce energy spending and carbon footprint. Today, data centers consume 3-5% of the total world energy consumption. Of this amount, at least 35% is associated with data center cooling management, 10% is consumed by power distribution units, 5% is the overhead and the remaining 50% is the compute power. Furthermore, rack level power demand is expected to increase by 10-20% between 2015 and 2020. In some implementations, racks are already being partially populated for this very reason.

Given these power trends, there has been tremendous focus in trying to optimize data center designs to recover rack space for IT and save energy. In order to achieve this, much attention has been given to the design of the mechanical systems such as chillers, free air economizers, high efficiency power distribution, and premium power supplies units. Further reductions in energy consumption and efficiency may be achieved by improving the individual components of the servers and other IT equipment.

Inside a typical air-cooled server, heat is generated mainly by the CPU, but also by the power supplies, memory, data storage device, networking controller, core chipset, and so on. As the amount of heat goes up, the fans have to run faster to remove that heat, but the relationship is not linear between power input to the fans and how effectively heat is removed. In fact, where the amount of heat energy removed increases linearly, the power to remove it increases by the cube.

Since an idle server still consumes power, some methods of power conservation will consolidate workload from several lightly-loaded servers to one heavily loaded server, and then suspend or shut-down the idled servers. However, this method requires suspend/resume capability be enabled, which is rarely something datacenter operators are willing to do. Furthermore, this method is also based on the mistaken assumption that the few heavily loaded servers are operating efficiently.

BRIEF SUMMARY

One embodiment of the present invention provides a method of assigning workload among servers in a power efficient manner. The method comprises accessing, for each of a plurality of servers, a previously stored relationship between power consumption efficiency and capacity utilization; obtaining, for each of the plurality of servers, a plurality of current component power consumption values; and calculating, for each of the plurality of servers, a current power consumption efficiency using the plurality of current component power consumption values. The method further obtains an amount of capacity utilization necessary to perform an additional workload or job. The method then determines, for each of the plurality of servers, a predicted power consumption efficiency by identifying a current capacity utilization that the stored relationship associates with the current power consumption efficiency, calculating a predicted capacity utilization value by adding the amount of capacity utilization necessary to perform the workload to the current capacity utilization, and identifying the predicted power consumption efficiency that the stored relationship associates with the predicted capacity utilization value. The method may then identify one of the plurality of servers that has the greatest predicted power consumption efficiency, and assigning the workload to the identified server.

Another embodiment of the present invention provides a second method of assigning workload among servers in a power efficient manner. The method comprises accessing, for each of a plurality of servers, a previously stored relationship between power consumption efficiency, capacity utilization and ambient air temperature; obtaining, for each of the plurality of servers, a plurality of current component power consumption values; and calculating, for each of the plurality of servers, a current power consumption efficiency using the plurality of current component power consumption values. The method further comprises obtaining an amount of capacity utilization necessary to perform the workload. Still further, the method includes determining, for each of the plurality of servers, a predicted power consumption efficiency by identifying a current capacity utilization that the stored relationship associates with the current power consumption efficiency, calculating a predicted capacity utilization value by adding the amount of capacity utilization necessary to perform the workload to the current capacity utilization, and identifying the predicted power consumption efficiency that the stored relationship associates with the predicted capacity utilization value. The method further comprises determining, for each of the plurality of servers, any improvement in power consumption efficiency between the current power consumption efficiency and the predicted power consumption efficiency, identifying one of the plurality of servers that would experience the greatest improvement in power consumption efficiency, and assigning the workload to the identified server.

Yet another embodiment of the present invention provides a computer program product comprising a computer readable storage medium having program instructions embodied therewith, wherein the program instructions are executable by a processor to cause the processor to perform a method. The method comprises accessing, for each of a plurality of servers, a previously stored relationship between power consumption efficiency and capacity utilization; obtaining, for each of the plurality of servers, a plurality of current component power consumption values; and calculating, for each of the plurality of servers, a current power consumption efficiency using the plurality of current component power consumption values. The method further obtains an amount of capacity utilization necessary to perform an additional workload or job. The method then determines, for each of the plurality of servers, a predicted power consumption efficiency by identifying a current capacity utilization that the stored relationship associates with the current power consumption efficiency, calculating a predicted capacity utilization value by adding the amount of capacity utilization necessary to perform the workload to the current capacity utilization, and identifying the predicted power consumption efficiency that the stored relationship associates with the predicted capacity utilization value. The method may then identify one of the plurality of servers that has the greatest predicted power consumption efficiency, and assigning the workload to the identified server.

A still further embodiment of the present invention provides a computer program product comprising a computer readable storage medium having program instructions embodied therewith, wherein the program instructions are executable by a processor to cause the processor to perform a second method of assigning workload among servers in a power efficient manner. The second method comprises accessing, for each of a plurality of servers, a previously stored relationship between power consumption efficiency, capacity utilization and ambient air temperature; obtaining, for each of the plurality of servers, a plurality of current component power consumption values; and calculating, for each of the plurality of servers, a current power consumption efficiency using the plurality of current component power consumption values. The method further comprises obtaining an amount of capacity utilization necessary to perform the workload. Still further, the method includes determining, for each of the plurality of servers, a predicted power consumption efficiency by identifying a current capacity utilization that the stored relationship associates with the current power consumption efficiency, calculating a predicted capacity utilization value by adding the amount of capacity utilization necessary to perform the workload to the current capacity utilization, and identifying the predicted power consumption efficiency that the stored relationship associates with the predicted capacity utilization value. The method further comprises determining, for each of the plurality of servers, any improvement in power consumption efficiency between the current power consumption efficiency and the predicted power consumption efficiency, identifying one of the plurality of servers that would experience the greatest improvement in power consumption efficiency, and assigning the workload to the identified server.

DETAILED DESCRIPTION

Figure 1:
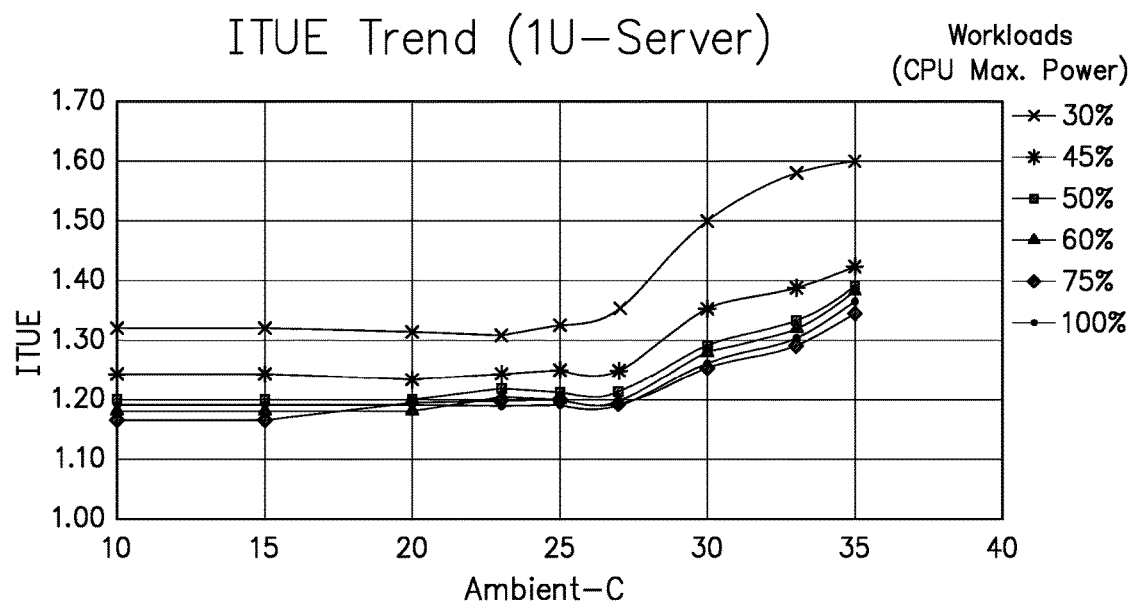
FIG. 1 is a diagram of a previously determined and stored relationship between power consumption efficiency and ambient temperature for various levels of capacity utilization.

One embodiment of the present invention provides a method of assigning workload among servers in a power efficient manner. The method comprises accessing, for each of a plurality of servers, a previously stored relationship between power consumption efficiency and capacity utilization; obtaining, for each of the plurality of servers, a plurality of current component power consumption values; and calculating, for each of the plurality of servers, a current power consumption efficiency using the plurality of current component power consumption values. The method further obtains an amount of capacity utilization necessary to perform an additional workload or job. The method then determines, for each of the plurality of servers, a predicted power consumption efficiency by identifying a current capacity utilization that the stored relationship associates with the current power consumption efficiency, calculating a predicted capacity utilization value by adding the amount of capacity utilization necessary to perform the workload to the current capacity utilization, and identifying the predicted power consumption efficiency that the stored relationship associates with the predicted capacity utilization value. The method further identifies one of the plurality of servers that has the greatest predicted power consumption efficiency, and assigning the workload to the identified server.

The previously stored relationship between power consumption efficiency and capacity utilization for each server may, for example, be measured on an identical server under closely controlled conditions using high precision sensors and instrumentation. Accordingly, the stored relationship is expected to provide an accurate representation of how the server's power consumption efficiency varies with the size and type of individual jobs or an overall workload made up of multiple jobs. Servers may be identified as being "identical" if they have the same model number, or perhaps if they have certain identical components such as the same processor and same amount of memory. In an ideal situation, each possible configuration of a server would have a previously stored relationship that is specific to servers having that particular configuration. The relationship between power consumption efficiency and capacity utilization is preferably stored in firmware on each server.

The previously stored relationship may also include data identifying the relationship with other operating conditions that also affect power consumption efficiency. In one example, the previously stored relationship will characterize how power consumption efficiency varies with capacity utilization and ambient air temperature. Ambient air temperature is an important condition that affects how much energy the server must devote to air moving devices, such as fans, in order to keep heat-generating components, such as the processor and memory, at acceptable temperatures. For example, as the ambient air temperature rises, the fan speeds must be increased and the percentage of total server power that is used by the computing components may decrease. Accordingly, embodiments of the present invention may further include measuring, for each of the plurality of servers, an ambient air temperature, wherein the previously stored relationship identifies a relationship between power consumption efficiency and capacity utilization at the measured ambient air temperature.

For each of the plurality of servers, a plurality of current component power consumption values are obtained. For example, the plurality of current component power consumption values may include current power consumption values for two or more components selected from a fan, power supply, voltage regulator, processor, memory, data storage device, and input output adapter. Current component power consumption values may be obtained for additional types and numbers of components. Without limitation, each server may have one or more of a node manager, a baseboard management controller and an integrated management module for obtaining the plurality of current component power consumption values.

Having obtained current component power consumption values, the method may calculate, for each of the plurality of servers, a current power consumption efficiency using the plurality of current component power consumption values. For example, the current power consumption efficiency may be calculated as a ratio of total power input to the server and total power used to perform computing tasks. As used herein, the term "power consumption efficiency" is not limited to one specific metric or equation. Furthermore, the term "power consumption efficiency" is specifically intended to encompass both the ratio of total power input to the server and total power used to perform computing tasks (i.e., (total server power)/(total computing power)) and its inverse (i.e., (total computing power)/(total server power)). The former may be represented by an Information Technology Usage Effectiveness (ITUE) value that always has a value greater than one, while the latter is a more intuitive value that may be represented as a percentage. The present invention is not limited to any particular representation of a power consumption efficiency. Furthermore, the current power consumption efficiency may be an instantaneous current power consumption efficiency or a moving average current power consumption efficiency.

The amount of capacity utilization necessary to perform the workload may be obtained in various ways. For example, a user may manually enter a capacity utilization value, perhaps based on previous experiences. Alternatively, each server may store a record of capacity utilization before and during performance of the workload each time the workload is performed. The identity of the workload may be associated with additional capacity utilization occurring while the workload is performed. Furthermore, the amount of capacity utilization necessary to perform the workload may be described in terms of various one or more parameters. For example, capacity utilization may be provided as a processor utilization. Furthermore, capacity utilization might be provided as a combination of a processor utilization and memory utilization. Any number and type of capacity utilization parameters may be used.

In one embodiment, the method identifies one of the plurality of servers that has the greatest predicted power consumption efficiency. For example, the method may rank the plurality of servers in order of predicted power consumption efficiency, and select the server having the greatest (most efficiency) predicted power consumption efficiency. Furthermore, the method may identify the plurality of servers from among a larger network of servers, wherein the plurality of servers each has sufficient available capacity to perform the additional workload. Accordingly, the method may identify a server having the greatest predicted power consumption efficiency among the plurality of servers that have sufficient available capacity to perform the additional workload. A management server is preferably the entity that identifies the server having the greatest predicted power consumption efficiency.

One optional feature that may be included in embodiments of the present invention provides for the correction of a measured current power consumption efficiency. On the basis that the mass-produced sensors and instruments that are responsible for measuring component power consumption are potentially less accurate that the precision sensors and instruments used to measure component power consumption in a controlled environment, the method may correct or "normalize" the measured current power consumption efficiency. Such process may include determining any offset between the current power consumption efficiency and the previously stored power consumption efficiency at the same capacity utilization and ambient air temperature. The method may then determine one or more correction factors that may be applied to the current power consumption efficiency so that the current power consumption efficiency will match the previously stored power consumption efficiency data. The one or more correction factors may be applied to the current power consumption efficiency before determining a predicted power consumption efficiency.

Another embodiment of the present invention provides a second method of assigning workload among servers in a power efficient manner. The method comprises accessing, for each of a plurality of servers, a previously stored relationship between power consumption efficiency, capacity utilization and ambient air temperature; obtaining, for each of the plurality of servers, a plurality of current component power consumption values; and calculating, for each of the plurality of servers, a current power consumption efficiency using the plurality of current component power consumption values. The method further comprises obtaining an amount of capacity utilization necessary to perform the workload. Still further, the method includes determining, for each of the plurality of servers, a predicted power consumption efficiency by identifying a current capacity utilization that the stored relationship associates with the current power consumption efficiency, calculating a predicted capacity utilization value by adding the amount of capacity utilization necessary to perform the workload to the current capacity utilization, and identifying the predicted power consumption efficiency that the stored relationship associates with the predicted capacity utilization value. The method further comprises determining, for each of the plurality of servers, any improvement in power consumption efficiency between the current power consumption efficiency and the predicted power consumption efficiency, identifying one of the plurality of servers that would experience the greatest improvement in power consumption efficiency, and assigning the workload to the identified server.

The foregoing method differs from the previous method primarily in the specific criteria used to identify or select one of the servers to be assigned the workload. However, both methods are similar in that they involve determining a predicted power consumption efficiency for each server as if the server were to be assigned the workload. Accordingly, methods of the present invention are able to make workload assignments in view of what impact the assignment would have on power consumption efficiency of each server. The second method may further include any additional aspect or step of the first method, such that each additional aspect or step will not be described again in the context of the second method.

Yet another embodiment of the present invention provides a computer program product comprising a computer readable storage medium having program instructions embodied therewith, wherein the program instructions are executable by a processor to cause the processor to perform a method. The method comprises accessing, for each of a plurality of servers, a previously stored relationship between power consumption efficiency and capacity utilization; obtaining, for each of the plurality of servers, a plurality of current component power consumption values; and calculating, for each of the plurality of servers, a current power consumption efficiency using the plurality of current component power consumption values. The method further obtains an amount of capacity utilization necessary to perform an additional workload or job. The method then determines, for each of the plurality of servers, a predicted power consumption efficiency by identifying a current capacity utilization that the stored relationship associates with the current power consumption efficiency, calculating a predicted capacity utilization value by adding the amount of capacity utilization necessary to perform the workload to the current capacity utilization, and identifying the predicted power consumption efficiency that the stored relationship associates with the predicted capacity utilization value. The method may then identify one of the plurality of servers that has the greatest predicted power consumption efficiency, and assigning the workload to the identified server.

A still further embodiment of the present invention provides a computer program product comprising a computer readable storage medium having program instructions embodied therewith, wherein the program instructions are executable by a processor to cause the processor to perform a second method of assigning workload among servers in a power efficient manner. The second method comprises accessing, for each of a plurality of servers, a previously stored relationship between power consumption efficiency, capacity utilization and ambient air temperature; obtaining, for each of the plurality of servers, a plurality of current component power consumption values; and calculating, for each of the plurality of servers, a current power consumption efficiency using the plurality of current component power consumption values. The method further comprises obtaining an amount of capacity utilization necessary to perform the workload. Still further, the method includes determining, for each of the plurality of servers, a predicted power consumption efficiency by identifying a current capacity utilization that the stored relationship associates with the current power consumption efficiency, calculating a predicted capacity utilization value by adding the amount of capacity utilization necessary to perform the workload to the current capacity utilization, and identifying the predicted power consumption efficiency that the stored relationship associates with the predicted capacity utilization value. The method further comprises determining, for each of the plurality of servers, any improvement in power consumption efficiency between the current power consumption efficiency and the predicted power consumption efficiency, identifying one of the plurality of servers that would experience the greatest improvement in power consumption efficiency, and assigning the workload to the identified server.

The foregoing computer program products may further include computer readable program code for implementing or initiating any one or more aspects of the methods described herein. Accordingly, a separate description of the methods will not be duplicated in the context of a computer program product.

FIG. 1 is a graph representing a previously determined and stored relationship between power consumption efficiency and ambient temperature for various levels of capacity utilization. In this example, power consumption efficiency of the server is represented as an Information Technology Usage Effectiveness (ITUE) of the server, and may be calculated as follows:

ITUE=(Total Energy into the Sever)/(Total Energy into the Compute Components)

In the graph, ITUE (vertical axis) is charted as a function of ambient air temperature (degrees Celsius; see horizontal axis) for a plurality of different total workload levels (CPU % Maximum Power; see legend). Specifically, the data shown is for a 1U Lenovo server for various CPU-intensive workloads.

Figure 2:
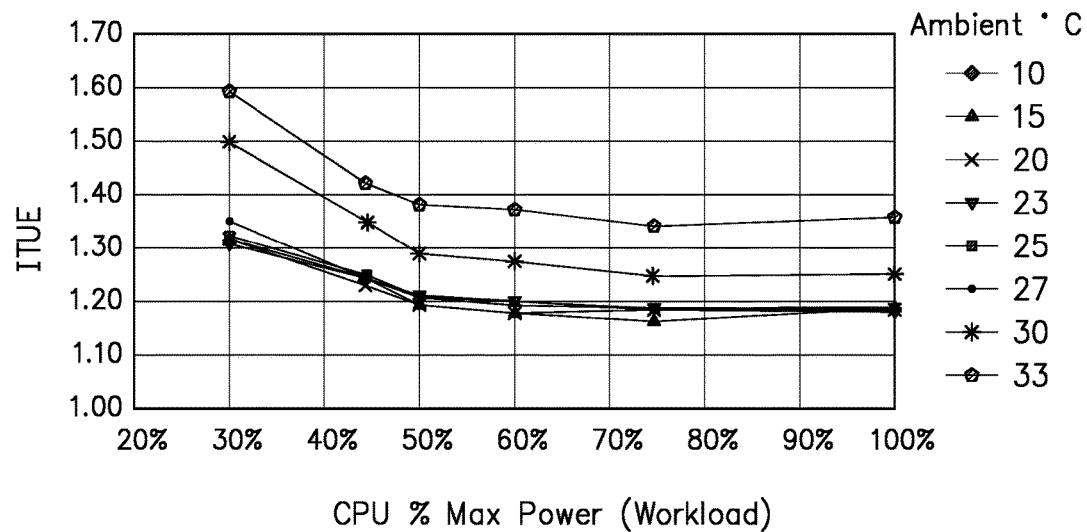
FIG. 2 is a diagram of the previously determined and stored relationship between power consumption efficiency and capacity utilization for various ambient temperatures.

FIG. 2 is a graph of the previously determined and stored relationship between power consumption efficiency and capacity utilization for various ambient temperatures. The graph of FIG. 2 is based on the same data as the graph of FIG. 1, but is presented as ITUE (vertical axis) versus total workload level (CPU % Maximum Power; see horizontal axis) for a plurality of ambient air temperatures (degrees Celsius; see legend). It should be recognized that the data represented in the graphs of FIG. 1 and FIG. 2 may be stored in a table or other forms.

Figure 3:
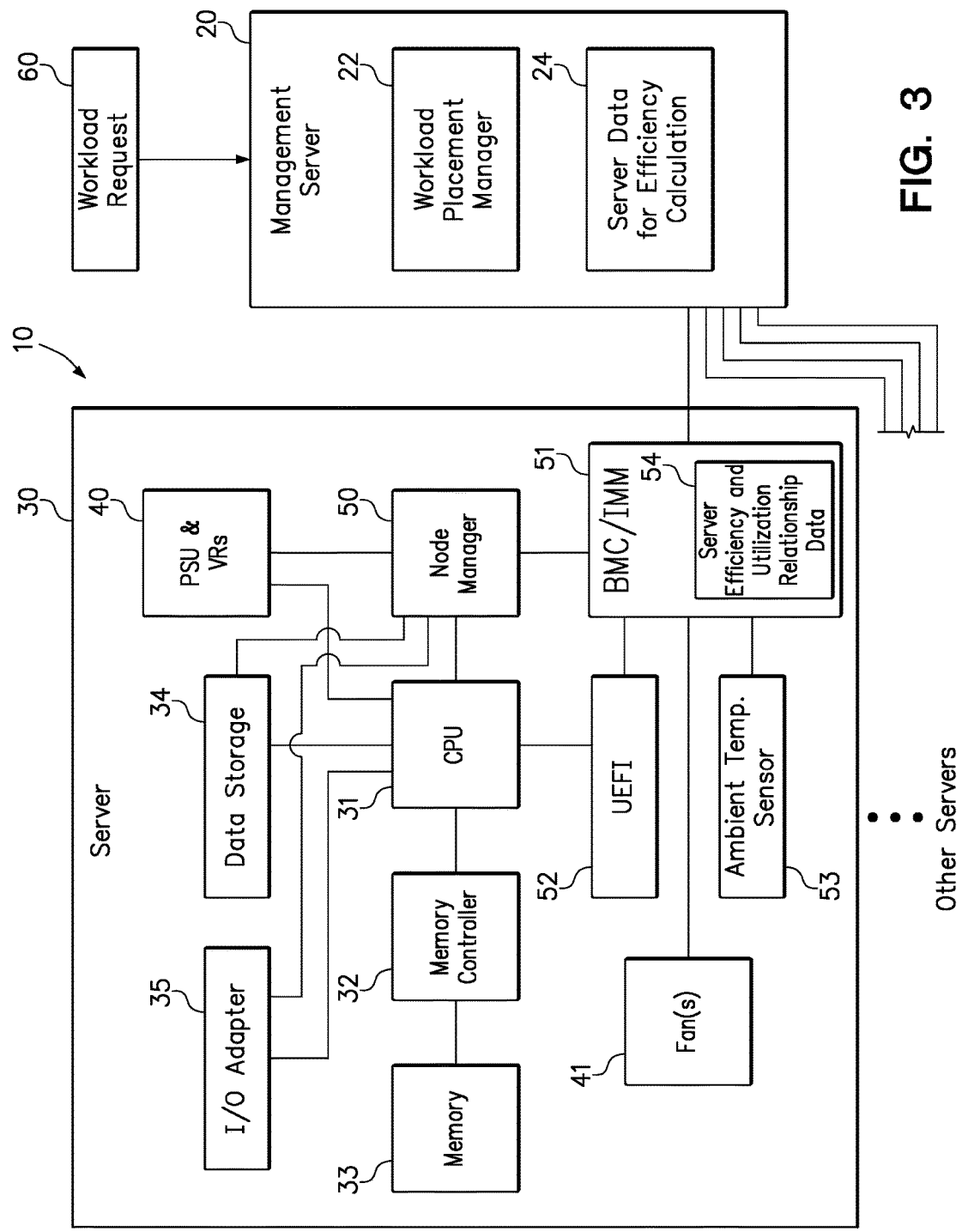
FIG. 3 is a diagram of a computing system in which a management server assigns workloads to a plurality of servers according to various embodiments of the present invention.

FIG. 3 is a diagram of a computing system 10 in which a management server 20 assigns workloads to a plurality of servers 30 according to various embodiments of the present invention. In this non-limiting example, each server 30 includes a computing components, such as the CPU 31, memory controller 32, memory 33, data storage device 34, and input output (I/O) adapter 35. Each server also include various power distribution components, such as the power supply unit (PSU) and voltage regulators 40, and various cooling system components, such as one or more fans 41. Still further, each server 30 includes out-of-band components or management-side components, such as a node manager 50, baseboard management controller (BMC) 51 (or integrated management module (IMM)), unified extensible firmware interface 52, and an ambient air temperature sensor 53. In the example shown, it is the BMC 51 that stores the server's power consumption efficiency and capacity utilization relationship data, such as that illustrated in FIGS. 1-2. The server configuration is not limited to the configuration shown, and there may be differences among the plurality of servers 30. However, for purposes of this example, it may be assumed that each of the servers 30 is identical.

In the illustrated server 30, the node manager 50 is responsible for obtaining power consumption values from the data storage device 34, the I/O adapter 35, the power supply unit and voltage regulators 40, the CPU 31, memory controller 32 and memory 33. The baseboard management controller 51 is responsible, in this example, for obtaining power consumption values for the fan(s) 41 and the ambient temperature measurement from the ambient temperature sensor 53. Optionally, data may be polled from one or more of the components using Intelligent Platform Management Interface (IPMI) commands. The range of components and power consumption values may vary from server to server, and the responsibilities for obtaining these values may be assigned to one of more the node manager 50 and the baseboard management controller (BMC) or integrated management module (IMM) 51. The data thus obtained may be used or stored by the BMC 51 as server efficiency and utilization relationship data 54 and/or shared with a management server 20. Optionally, the management server 20 may poll the BMC 51 or node manager 50 using IPMI commands.

While each server is illustrated with a node manager and a baseboard management controller (BMC) or integrated management module (IMM), it is believed that various sensors, subsystems or components of the server may be monitored by the node manager, the BMC/IMM or some combination thereof. For example, it is believed that embodiments of the invention may rely upon a node manager to obtain most or all of the performance data needed for the ITUE calculations, while other embodiments of the invention may rely upon a BMC/IMM to obtain most or all of the performance data.

The AC input to the PSU may be considered the total system power, but the PSU module is inefficient and consumes power. "Output power" is the power available downstream of the power supply. The output power is the DC power available after the PSU has converted the AC input to DC output. Voltage regulators (VRs) typically receive the 12V DC power output of the PSU and step down the voltage to the 5 V, 3.3 V, 1.3 V, etc. DC power used by various subcomponents of the server. A VR efficiency curve identifies the power losses that occur in the voltage regulators, and may be used to identify the distributed power losses occurring within the system downstream of the PSU.

If a server component cannot provide a power consumption value directly, alternative values may be obtained and converted into a power consumption value. For example, obtaining a fan speed (RPM) of the fan(s) 41 enables a calculation of cooling energy spent by the fan(s) by using a speed to power consumption correlation. Similarly, a power consumption value to a PSU 40 may be determined using a PSU efficiency curve or data and the input power to the PSU 40. Similarly, a voltage regulator (VR) efficiency curve or data may be used to determine the power consumption of the voltage regulators from the PSU output power (i.e., input power to the voltage regulators).

The management server 20 includes a workload placement manager 22, which is an application program that receives workload requests 60 and identifies one of the servers 30 to which the workload will be assigned. To facilitate this decision, the management server 20 may store server data 24 that is used in the power consumption efficiency calculations. Optionally, the server data 24 may include any or all of the server efficiency and utilization relationship data 54 from each of the servers 30. The data 54, 24 may be the raw component power consumption values or a power consumption efficiency, such as ITUE, calculated from the raw component power consumption values. For example, the ITUE (Information Technology Usage Effectiveness) of each server can be calculated at a given point in time for any workload, using the equation:

ITUE=(Total Server Power)/(Total Server Power−
PSU losses−Power Distribution losses−Cooling
system losses)

The computing system 10 is not limited to any particular topology and may be applied in various types of data centers, such as a virtualized server farm or a high performance computing (HPC) data center. Furthermore, the methods of the present invention may be equally applicable to homogenous and heterogeneous server populations. The algorithm will rate the servers based on a predicted energy efficiency of the server for a given workload and helps the workload placement manager to identify the most efficient server before placing a new workload or moving workload when needed.

It should be recognized that access to the power consumption of additional server subsystems, such as memory, I/O and data storage, enables a more detailed determination of how these subsystems affect changes in server power efficiency. Subsystem loading, especially the CPU, will often dictate fan speeds, which clearly effects system efficiency. The objective is to understand the cause and effect relationship between loading and fan speed response, which can be then correlated to the in-situ run-time efficiency value as calculated above. Accordingly, embodiments of the present invention may monitor power consumption of other subsystems, such as the memory and data storage devices, and treat that data in the same manner as the CPU power consumption.

Figure 4:
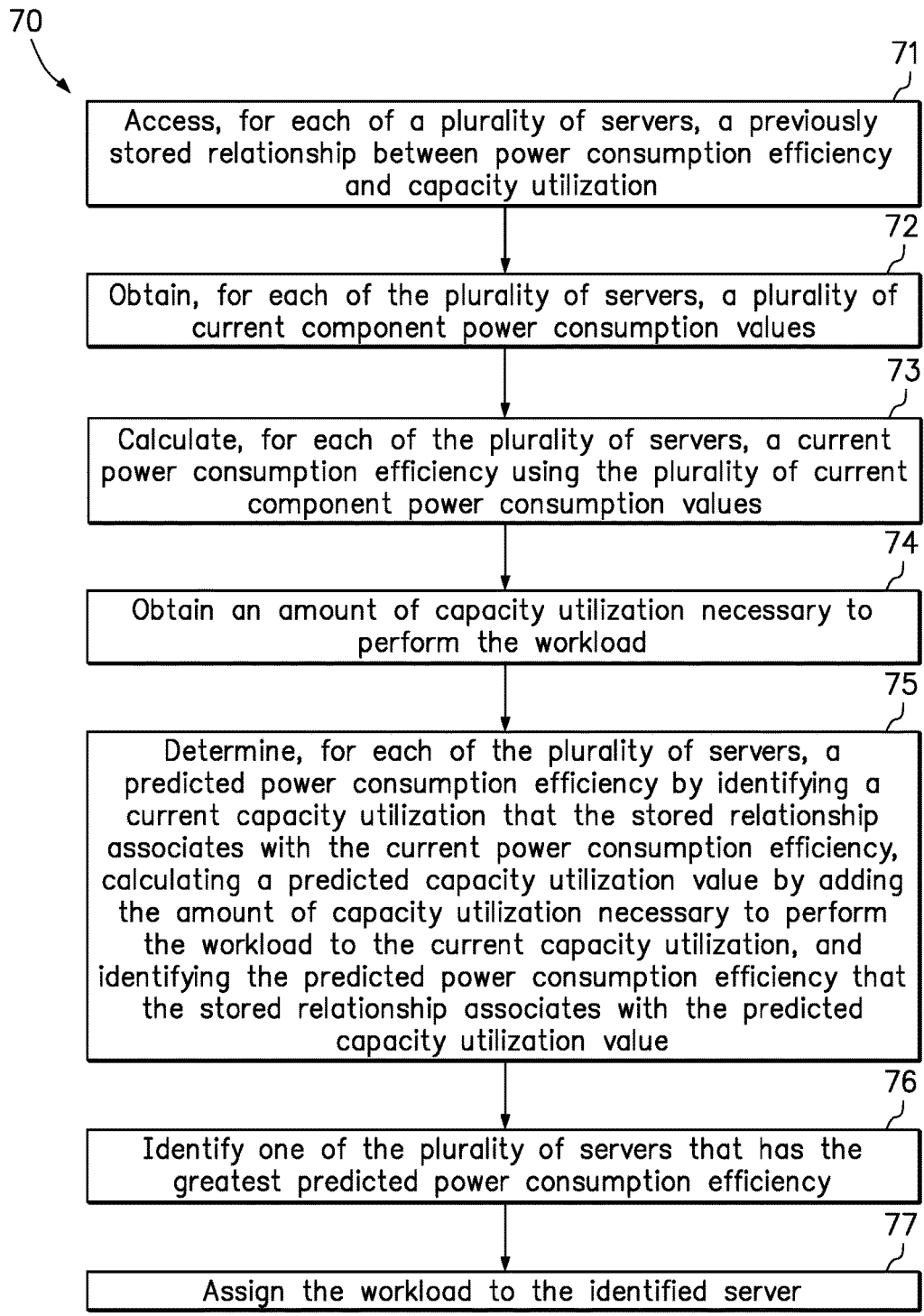
FIG. 4 is a flowchart of a method according to one embodiment of the present invention.

FIG. 4 is a flowchart of a method 70 of assigning workload among servers in a power-efficient manner according to one embodiment of the present invention. Such a method may be performed collectively by the node manager 50, the BMC 51, and the workload placement manager 22 (see FIG. 3). In step 71, the method accesses, for each of a plurality of servers, a previously stored relationship between power consumption efficiency and capacity utilization. In step 72, the method obtains, for each of the plurality of servers, a plurality of current component power consumption values. In step 73, the method calculates, for each of the plurality of servers, a current power consumption efficiency using the plurality of current component power consumption values. The method then, in step 74, obtains an amount of capacity utilization necessary to perform an additional workload. In step 75, the method determines, for each of the plurality of servers, a predicted power consumption efficiency by identifying a current capacity utilization that the stored relationship associates with the current power consumption efficiency, calculating a predicted capacity utilization value by adding the amount of capacity utilization necessary to perform the workload to the current capacity utilization, and identifying the predicted power consumption efficiency that the stored relationship associates with the predicted capacity utilization value. Step 76 identifies one of the plurality of servers that has the greatest predicted power consumption efficiency, and step 77 assigning the workload to the identified server.

Figure 5:
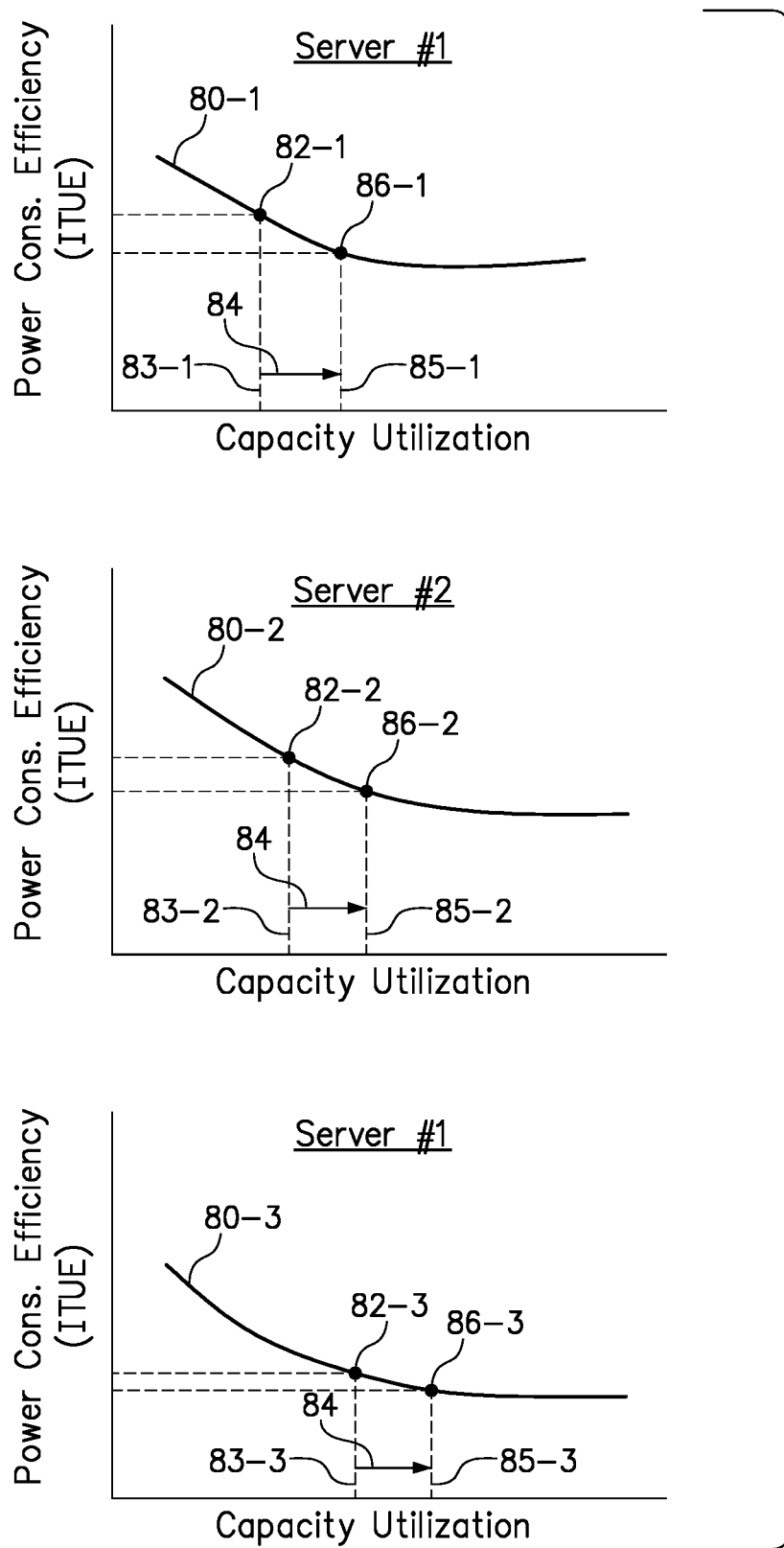
FIG. 5 includes graphs of the previously stored power consumption efficiency relationships for each of three servers currently operating at different levels of capacity utilization.

FIG. 5 includes graphs of the previously stored power consumption efficiency relationships (see FIGS. 1 and 2) for each of three servers having sufficient capabilities and current availability to perform an additional workload. As shown, each server is currently operating at a different level of capacity utilization. For the purpose of discussing the three graphs, it may be assumed that the three servers (Server #1, Server #2 and Server #3) are identical and have the same power consumption efficiency relationship. In other words, for any given ambient air temperature, each of the servers has the same relationship between power consumption efficiency (vertical axis) and capacity utilization (horizontal axis).

For each server, a method accesses, for each of the three servers (Server #1, Server #2 and Server #3), a previously stored relationship between power consumption efficiency and capacity utilization. This is shown by the solid curved lines (80-1, 80-2 and 80-3) in each graph. The method obtains, for each of the servers, a plurality of current component power consumption values and calculates a current power consumption efficiency (82-1, 82-2 and 82-3, respectively) using the plurality of current component power consumption values. The method then obtains an amount of capacity utilization necessary to perform an additional workload or job, where the additional capacity utilization associated with the additional job is a fixed distance along the horizontal axis (see identical arrow 84 in each graph). The method may then determine, for each of the plurality of servers, a predicted power consumption efficiency (86-1, 86-2 and 86-3, respectively) by identifying a current capacity utilization (83-1, 83-2 and 83-3, respectively) that the stored relationship associates with the current power consumption efficiency, calculating a predicted capacity utilization value (85-1, 85-2 and 85-3, respectively) by adding the amount of capacity utilization 84 necessary to perform the workload to the current capacity utilization, and identifying the predicted power consumption efficiency (86-1, 86-2 and 86-3, respectively) that the stored relationship (80-1, 80-2 and 80-3, respectively) associates with the predicted capacity utilization value. The method then assigns the additional workload to the server identified as having the greatest predicted power consumption efficiency.

Even with three identical servers having the same stored relationship between power consumption efficiency and capacity utilization, the fact that the servers have different current capacity utilization values means that the servers will have different predicted power consumption efficiency (86-1, 86-2 and 86-3, respectively). As shown, Server #1 has the lowest capacity utilization and would experience the greatest efficiency improvement as a result of being assigned the additional workload. By contrast, Server #3 has the greatest capacity utilization and would achieve the greatest power consumption efficiency (i.e., lowest ITUE) as a result of being assigned the additional workload. It should be appreciated that the methods of the present invention are equally applicable to servers that are not identical.

In one embodiment, the method enables user selection of a workload assignment mode, perhaps using a graphical user interface to the BMC/IMM or the workload placement manager. In a first workload assignment mode, the additional workload may be assigned to the server that is identified as performing the workload with the greatest efficiency. In the foregoing example, this would be Server #3. Accordingly, less efficient servers may enter a sleep state resulting in power savings.

In a second workload assignment mode, the workload is assigned to the server that is identified as having the greatest efficiency improvement. Accordingly, an overall ITUE for the data center will also improve. In the foregoing example, this second workload assignment mode results in assignment of the workload to Server #1.

Figure 6:
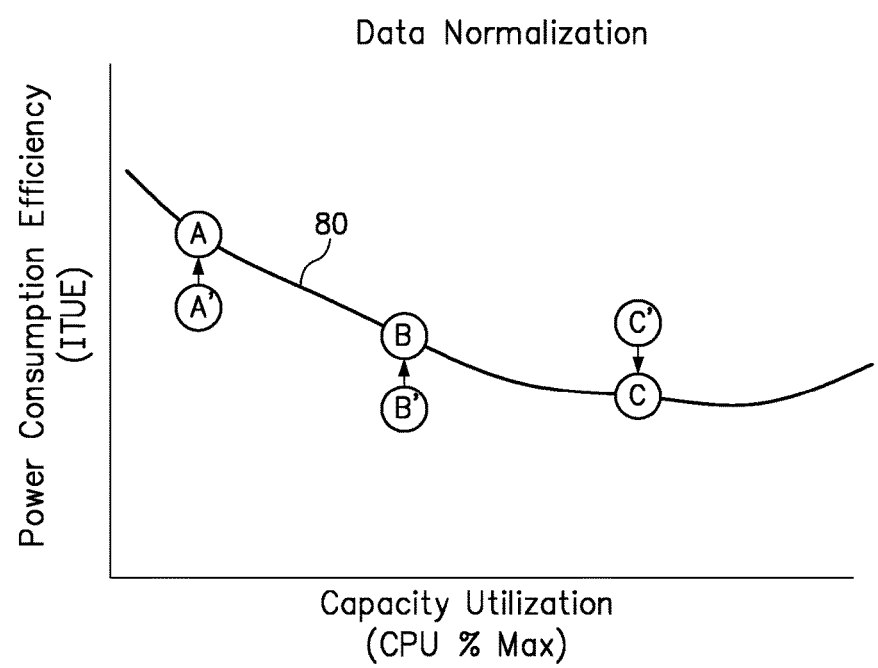
FIG. 6 is a graph illustrating current power consumption efficiency measurements compared to the previously stored power consumption efficiency relationships under three identical workload conditions.

FIG. 6 is a graph illustrating current power consumption efficiency measurements compared to the previously stored power consumption efficiency relationship 80 under three identical workload conditions. Current ITUE values calculated on the basis of measured power consumption values for various components of a server may be normalized with respect a predetermined ITUE curve 80 stored by the server. The predetermined ITUE data or curve(s) 80 has been determined from controlled laboratory measurements of server performance under various workloads (A, B and C) and conditions, and is stored in the server before shipment or installation. The predetermined ITUE data 80 is believed to be more accurate than the actual ITUE calculated by the server during actual use, primarily due to possible sensor inaccuracies, measurement errors, or variations in installation details. Therefore, actual ITUE measurements (A', B' and C') made by the deployed server under the same workloads and conditions are compared to the predetermined ITUE data. Any offset between the measured ITUE value (A', B' and C') and the predetermined ITUE values (A, B and C), under similar workload and conditions, may be determined and one or more correction factors may be used so that the measured ITUE values (A', B' and C') are made to match the predetermined ITUE values (A, B and C). This normalization of the actual ITUE is believed to improve the accuracy of a method to identify the server that will perform a workload most efficiently.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   accessing, for each of a plurality of servers, a previously stored relationship between power consumption efficiency and capacity utilization;
   obtaining, for each of the plurality of servers, a plurality of current server component power consumption values;
   calculating, for each of the plurality of servers, a current power consumption efficiency using the plurality of current server component power consumption values;
   obtaining an amount of capacity utilization necessary to perform an additional workload;
   determining, for each of the plurality of servers, a predicted power consumption efficiency by identifying a current capacity utilization that the stored relationship associates with the current power consumption efficiency, calculating a predicted capacity utilization value by adding the amount of capacity utilization necessary to perform the additional workload to the current capacity utilization, and identifying the predicted power consumption efficiency that the stored relationship associates with the predicted capacity utilization value;
   identifying one of the plurality of servers that has the greatest predicted power consumption efficiency; and
   assigning the additional workload to the identified server.

2. The method of claim 1, wherein the capacity utilization is a processor utilization.

3. The method of claim 1, wherein the previously stored relationship for each server is stored in firmware on each server.

4. The method of claim 1, wherein the current power consumption efficiency is calculated as a ratio of total power input to the server and total power used to perform computing tasks.

5. The method of claim 1, wherein the current power consumption efficiency is an instantaneous current power consumption efficiency.

6. The method of claim 1, wherein the current power consumption efficiency is a moving average current power consumption efficiency.

7. The method of claim 1, wherein identifying one of the plurality of servers that has the greatest predicted power consumption efficiency, includes ranking the plurality of servers in order of predicted power consumption efficiency.

8. The method of claim 1, further comprising:
   identifying the plurality of servers from among a larger network of servers, wherein the plurality of servers each has sufficient available capacity to perform the additional workload.

9. The method of claim 1, wherein the plurality of current component power consumption values include current power consumption values for two or more components selected from a fan, power supply, voltage regulator, processor, memory, data storage device, and input output adapter.

10. The method of claim 1, wherein a management server identifies the server having the greatest predicted power consumption efficiency.

11. The method of claim 1, wherein accessing, for each of a plurality of servers, a previously stored relationship between power consumption efficiency and capacity utilization, includes accessing, for each of the plurality of servers, a previously stored relationship between power consumption efficiency, capacity utilization and ambient air temperature.

12. The method of claim 11, further comprising:
measuring, for each of the plurality of servers, an ambient air temperature, wherein the previously stored relationship identifies a relationship between power consumption efficiency and capacity utilization at the measured ambient air temperature.

13. The method of claim 1, wherein each server has one or more of a node manager, a baseboard management controller and an integrated management module for obtaining the plurality of current server component power consumption values.

14. The method of claim 1, wherein obtaining an amount of capacity utilization necessary to perform the additional workload, includes storing a record of capacity utilization before and during performance of the workload each time the workload is performed.

15. The method of claim 1, further comprising:
determining any offset between the current power consumption efficiency and the previously stored power consumption efficiency at the same capacity utilization and ambient air temperature;
determining one or more correction factors that may be applied to the current power consumption efficiency so that the current power consumption efficiency will match the previously stored power consumption efficiency data; and
applying the one or more correction factors to the current power consumption efficiency before determining a predicted power consumption efficiency.

16. A computer program product comprising a non-transitory computer readable storage medium having program instructions embodied therewith, the program instructions executable by a processor to cause the processor to perform a method comprising:
accessing, for each of a plurality of servers, a previously stored relationship between power consumption efficiency and capacity utilization;
obtaining, for each of the plurality of servers, a plurality of current server component power consumption values;
calculating, for each of the plurality of servers, a current power consumption efficiency using the plurality of current server component power consumption values;
obtaining an amount of capacity utilization necessary to perform an additional workload;
determining, for each of the plurality of servers, a predicted power consumption efficiency by identifying a current capacity utilization that the stored relationship associates with the current power consumption efficiency, calculating a predicted capacity utilization value by adding the amount of capacity utilization necessary to perform the additional workload to the current capacity utilization, and identifying the predicted power consumption efficiency that the stored relationship associates with the predicted capacity utilization value;
identifying one of the plurality of servers that has the greatest predicted power consumption efficiency; and
assigning the additional workload to the identified server.

17. The computer program product of claim 16, wherein the previously stored relationship for each server is stored in firmware on each server.

18. The computer program product of claim 16, further comprising:
identifying the plurality of servers from among a larger network of servers, wherein the plurality of servers each has sufficient available capacity to perform the additional workload.

* * * * *